US009188187B2

(12) United States Patent
Jolley et al.

(10) Patent No.: US 9,188,187 B2
(45) Date of Patent: Nov. 17, 2015

(54) GAS SPRING ASSEMBLY WITH PRE-PAINT PROTECTIVE SLEEVE

(75) Inventors: Alan Jolley, Gastonia, NC (US); Sardar Imtiaz Ahmed, Matthews, NC (US)

(73) Assignee: STABILUS, INC, Gastonia, NC (US)

( * ) Notice: Subject to any disclaimer, the term of this patent is extended or adjusted under 35 U.S.C. 154(b) by 650 days.

(21) Appl. No.: 12/258,212

(22) Filed: Oct. 24, 2008
(Under 37 CFR 1.47)

(65) Prior Publication Data
US 2009/0266661 A1 Oct. 29, 2009

Related U.S. Application Data

(63) Continuation of application No. 11/784,612, filed on Apr. 9, 2007, now abandoned, which is a continuation of application No. 10/568,518, filed as application No. PCT/US2004/026132 on Aug. 12, 2004, now abandoned.

(60) Provisional application No. 60/494,728, filed on Aug. 13, 2003.

(51) Int. Cl.
*F16F 9/38* (2006.01)
*B05B 15/04* (2006.01)

(52) U.S. Cl.
CPC ............ *F16F 9/38* (2013.01); *B05B 15/0456* (2013.01); *Y10T 29/49986* (2015.01)

(58) Field of Classification Search
USPC ........... 188/322.12; 267/64.11; 118/504, 505; 206/446, 806
See application file for complete search history.

(56) References Cited

U.S. PATENT DOCUMENTS

| 2,227,453 | A |   | 1/1941  | Koch              |         |
|-----------|---|---|---------|-------------------|---------|
| 3,042,796 | A |   | 7/1962  | De Forest         |         |
| 3,151,668 | A | * | 10/1964 | Zimmermann        | 206/806 |
| 3,850,141 | A |   | 11/1974 | Schmitt           |         |
| 4,372,429 | A |   | 2/1983  | Marx              |         |
| 4,443,283 | A | * | 4/1984  | Sarkisian         | 156/211 |
| 4,591,137 | A |   | 5/1986  | Steinberg         |         |
| 4,921,028 | A |   | 5/1990  | Schwartz          |         |
| 5,074,390 | A |   | 12/1991 | Fuhrmann et al.   |         |
| 5,791,445 | A |   | 8/1998  | Kaufmann et al.   |         |
| 5,816,305 | A | * | 10/1998 | May               | 150/165 |
| 6,334,711 | B1|   | 1/2002  | Risgalla et al.   |         |
| 6,547,313 | B2| * | 4/2003  | Syron             | 118/505 |
| 6,609,613 | B2| * | 8/2003  | Schneider et al.  | 206/806 |
| 6,883,205 | B2| * | 4/2005  | Martinez-Munoz    | 16/251  |

(Continued)

FOREIGN PATENT DOCUMENTS

FR 2028484 10/1970
FR 2636404 3/1990

(Continued)

OTHER PUBLICATIONS

U.S. Appl. No. 11/784,612, filed Apr. 9, 2007, Jolley.

(Continued)

*Primary Examiner* — Thomas J Williams
(74) *Attorney, Agent, or Firm* — Baker Botts L.L.P.

(57) ABSTRACT

A gas spring assembly includes a gas spring enclosed within a flexible, liquid-impermeable protective sleeve. The sleeve protects the gas spring against contamination during painting and pre-paint processes, and is then removable to leave the gas spring as a permanent component of the installation subject to the painting.

10 Claims, 2 Drawing Sheets

(56) References Cited

U.S. PATENT DOCUMENTS

2002/0130451 A1* 9/2002 Larsen ........................ 188/300
2004/0187990 A1* 9/2004 D'Andreta .................. 150/154

FOREIGN PATENT DOCUMENTS

| JP | 6263186 | 9/1994 |
| JP | 9100411 | 4/1997 |
| JP | 10193454 | 7/1998 |
| JP | 2001286319 | 10/2001 |
| JP | 2003053869 | 2/2003 |

OTHER PUBLICATIONS

U.S. Appl. No. 10/568,518, filed Feb. 13, 2006, Jolley et al.

* cited by examiner

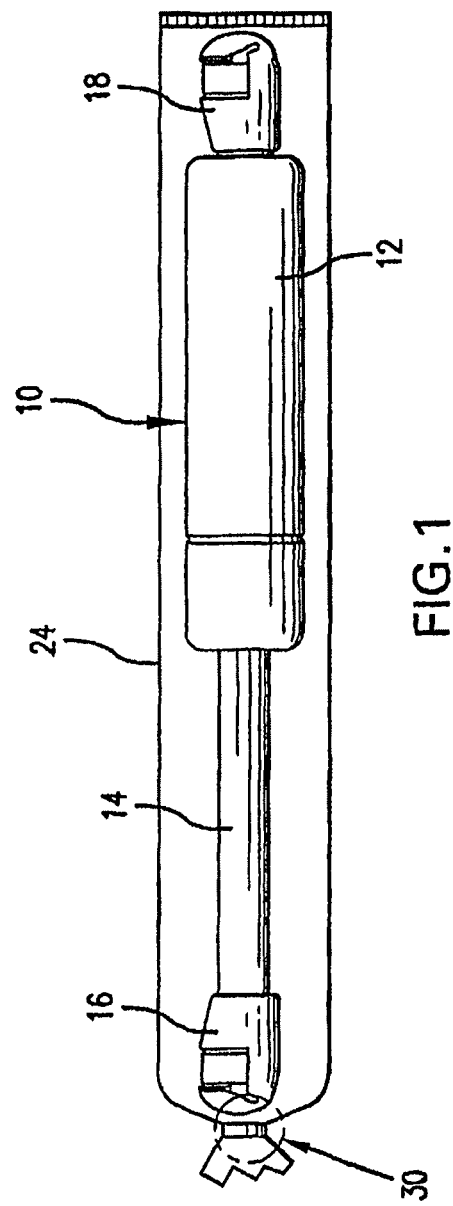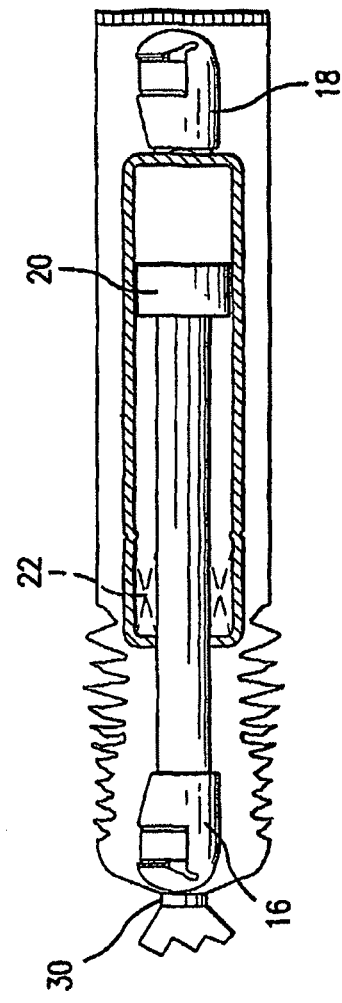

GAS SPRING ASSEMBLY WITH PRE-PAINT PROTECTIVE SLEEVE

CROSS REFERENCE TO RELATED APPLICATIONS

The present application is a continuation of U.S. patent application Ser. No. 11/784,612, filed Apr. 9, 2007 now abandoned, which is a continuation of U.S. patent application Ser. No. 10/568,518, filed Feb. 13, 2006 now abandoned, which is a national phase of International Application Serial No. PCT/US04/026132, filed Aug. 12, 2004, published Feb. 24, 2005, which claims the benefit of U.S. Provisional Application Ser. No. 60/494,728, filed Aug. 13, 2003, each of which are incorporated by reference herein in their entireties, and from which priority is claimed.

BACKGROUND OF THE INVENTION

1. Field of the Invention

The present invention relates to a protective sleeve or covering for a gas spring and, more particularly, to a gas spring assembly including a protective sleeve or covering for protecting a gas spring against contamination during a painting process and for the subsequent post-processing removal from the gas spring.

2. The Related Art

Gas springs are widely used to assist in opening and closing the hinged deck lids, such as the hood, the hatchback, the trunk, and the like, of automotive vehicles. During the assembly of the vehicles, it is desirable to install the gas springs in their operating positions on the vehicle body, so that they are available to hold the lids in the open position when necessary during the manufacturing process. Certain processing steps, however, involve exposure of the vehicle body to materials and conditions that are detrimental to the gas springs. During pre-painting and painting processing steps, in particular, the vehicle body is typically exposed to pre-treatment chemicals, primers, paint, etc., which, if coming into contact with the gas spring components, can adversely affect the subsequent operation of the gas springs during use of the vehicle.

Previous attempts to prevent the contamination of gas springs under the foregoing conditions have involved the use of replaceable paint-line gas springs, referred to as "paint slaves," or prop rods, which are used only during the painting processes and are then replaced by the permanent, original equipment gas springs. After each use, such "paint slave" gas springs or prop rods must be removed from the vehicle body and transported to a different location for cleaning, re-use, or disposal in the event of failure. These additional handling and process steps are costly and time consuming.

SUMMARY OF THE INVENTION

It is an object of the invention to overcome the foregoing and other disadvantages of the prior art by providing a removable protective sleeve for a gas spring which enables a gas spring to be installed on a vehicle prior to the vehicle paint and pre-paint preparation processes and remain permanently on the vehicle as an original equipment gas spring, but with the sleeve being removable after the processing steps are completed. In accordance with the invention, the protective sleeve covers the entire gas spring, including the end fittings, and is made of a flexible, liquid spray-impermeable material that is capable of withstanding the high temperature of the paint drying process and, at the same time, of being readily strippable from the gas spring after the painting process has been completed. Preferably, the sleeve material is a polypropylene or a polyamide, with polyamide being more preferable.

The sleeve is preferably manufactured as a flat, elongated envelope sealed along both side edges and at one end, leaving the opposite end open. The sleeve is assembled over the gas spring by sliding the gas spring into the open end of the envelope, and thereafter securely closing the open sleeve end with a twist tie, clip, heat seal, or other suitable closure mechanism.

BRIEF DESCRIPTION OF THE DRAWINGS

For a more complete understanding of the present invention, and the advantages thereof, reference may be made to the following description of exemplary embodiments thereof, taken in conjunction with the accompanying drawings in which:

FIG. 1 is a schematic view of an embodiment of a gas spring/protective sleeve assembly in accordance with the invention, showing the piston rod in an extended position;

FIG. 2 is a longitudinal sectional view of the embodiment of FIG. 1, showing the piston rod in a retracted position;

DETAILED DESCRIPTION OF EXEMPLARY EMBODIMENTS

Figure 3:
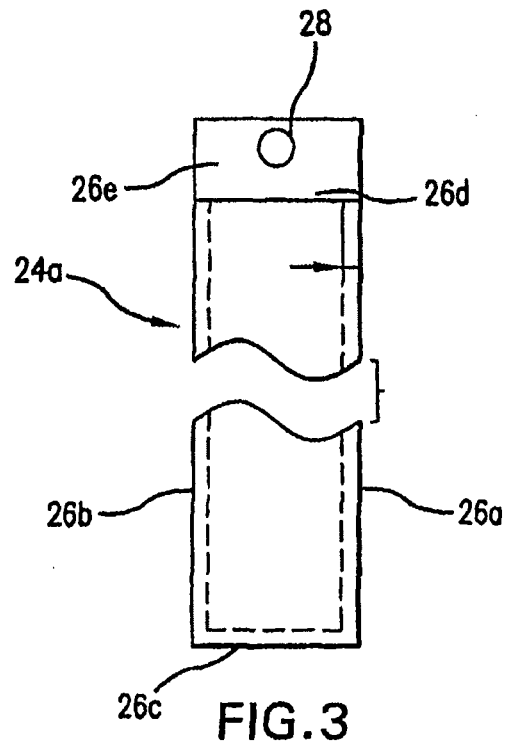
FIG. 3 is a plan view of one embodiment of a protective sleeve in accordance with the invention.

As shown in FIGS. 1 and 2, a gas spring 10 of the type installed to a hinged lid in an automotive vehicle conventionally includes a cylinder 12, a piston rod 14, end fittings 16 and 18, a piston 20, and a main seal 22. In accordance with the invention, a protective sleeve 24 encloses the entire gas spring 10, including the end fittings 16 and 18. The sleeve 24 is assembled on the gas spring 10 prior to the gas spring being installed in its operating location on the vehicle body, e.g., between the vehicle body and a hinged lid such as a hood, hatchback, etc. It is intended that the gas spring 10 will remain on the vehicle for the functional life of the gas spring but that the sleeve 24 will be removed and discarded after the paint process has been completed. Thus, the sleeve 24 must protect the gas spring against visible marring and preserve its functionality during and after the paint process. The protective sleeve 24, therefore, preferably has the following characteristics: (a) will not be liquid spray permeable, (b) will be flexible, (c) will be functional after the paint process, and (d) will be removable and disposable after the paint process.

In accordance with the foregoing, the protective sleeve 24 preferably comprises a transparent polypropylene or polyamide material having a thickness of less than 0.05 mm, with polyamide being the preferred material. To withstand the temperatures typically encountered in the drying stage of a vehicular paint process, the sleeve material should remain functional at 180° C. for a period of 30 minutes.

Those skilled in the art will further appreciate that the gas spring must also be able to withstand the painting temperatures and other durability criteria. By way of example, a gas spring having two main seals with metal oil cushion and metal piston may be used.

Two embodiments of the protective sleeve 24a and 24b are shown in FIGS. 3 and 4 and FIGS. 5 and 6, respectively.

Figure 4:
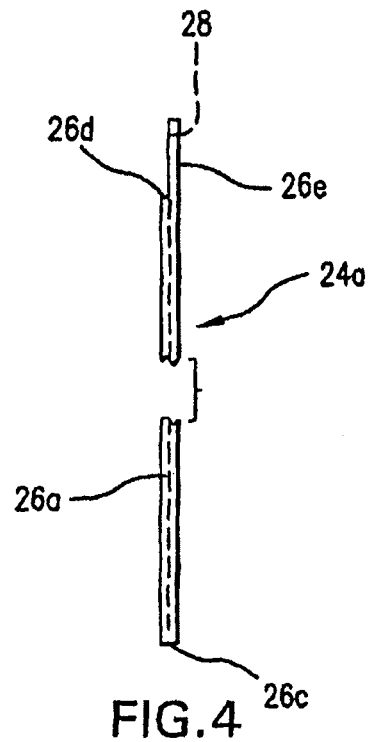
FIG. 4 is a side view of the protective sleeve of FIG. 3.

In the embodiment of FIGS. 3 and 4, the sleeve 24a is made of a polypropylene material and comprises a flat envelope sealed along both side edges 26a, 26b and one end 26c. At the other end 26d the envelope is open, and preferably has one wall 26e projecting past the open end 26d. The projecting wall portion 26e may be formed with an opening 28. During the assembly of the sleeve on the gas spring, the sleeve 24a may be suspended vertically by engaging a hook in the opening 28, with the gas spring then being inserted vertically downward into the sleeve.

Once the gas spring is fully inserted, the open end 26d of the envelope is tied off in a liquid-tight manner as indicated generally at 30 in FIG. 1. Any suitable mechanism may be used to tie off the sleeve, including, for example, a twist tie, a clip, a heat seal, etc.

Figure 5:
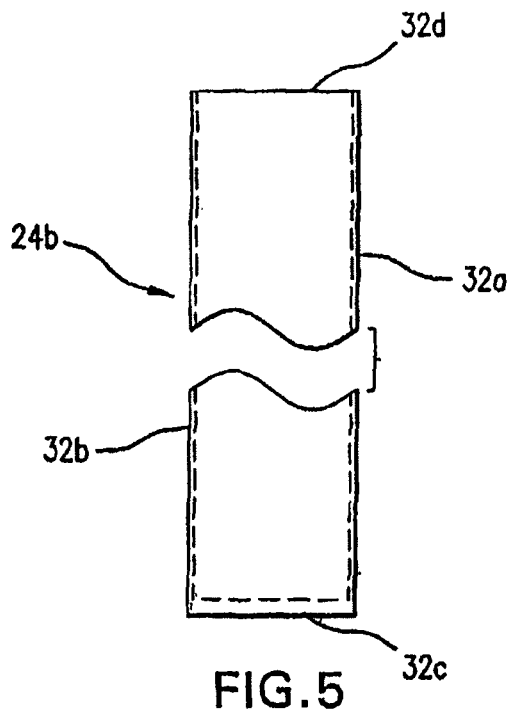
FIG. 5 is a plan view of another embodiment of a protective sleeve in accordance with the invention.
Figure 6:
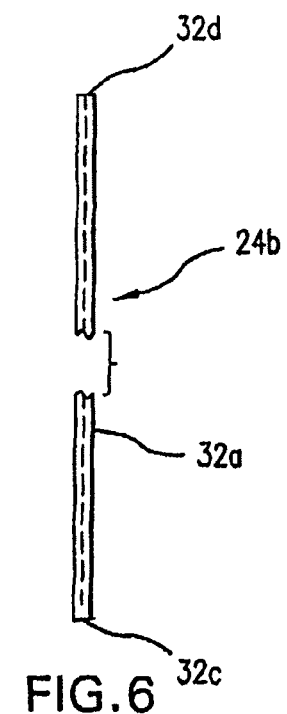
FIG. 6 is a side view of the embodiment of FIG. 5.

The sleeve embodiment 24b of FIGS. 5 and 6 is similar to that of FIGS. 3 and 4, but is made of a polyamide material and omits the projected wall portion 26e of that embodiment. The sleeve 24b may be held manually at its upper end 32d while the gas spring is inserted, or it may be mechanically gripped. Upon full insertion of the gas spring, the sleeve 24b is tied off at 30 as previously described.

The sleeved gas spring described herein may be installed in a vehicle in a conventional manner prior to the paint process. Each end of the sleeve will be penetrated by the ball studs on the vehicle. However, the end fittings will still be protected because the only penetration is at the ball socket opening of the fitting which is not exposed during the paint process. Following completion of the paint process, all visible portions of the sleeve are stripped from the gas spring.

The above-described embodiments are intended to be only exemplary and are susceptible of variations and modifications that are intended to be included within the scope of the invention.

What is claimed is:

1. A gas spring assembly for permanent installation in a vehicle in advance of a painting process to which the vehicle is subjected, comprising:

a gas spring comprising a cylinder having a closed end and an open end, a piston rod telescopingly received at one end within the open end of the cylinder and having a free end outside of the cylinder, and an end fitting mounted on each of the closed end of the cylinder and the free end of the piston rod, each end fitting comprising a ball socket having an opening for receiving a ball stud; and a removable protective sleeve enclosing the gas spring in its entirety, including the end fittings, and being closed at both ends thereof, said protective sleeve comprising a flexible, liquid spray-impermeable material capable of extending and contracting with telescopic movement of the piston rod relative to the cylinder and of being substantially stripped from the gas spring following the completion of the painting process, leaving the gas spring as a permanent component of the vehicle, wherein the protective sleeve is positioned to cause the ball studs to penetrate the removable protective sleeve within the ball socket openings to prevent exposure of the gas spring when the gas spring assembly is installed in the vehicle.

2. The gas spring assembly of claim 1 wherein the liquid spray-impermeable material is a polypropylene.

3. The gas spring assembly of claim 1 wherein the liquid spray-impermeable material is a polyamide.

4. The gas spring assembly of claim 1 wherein the protective sleeve is closed with at least one of a twist tie, clip, or heat seal.

5. A method for permanently installing a gas spring in a vehicle in advance of a painting process to which the vehicle is subject, comprising the steps: receiving a gas spring, wherein the gas spring comprises a cylinder having a closed end and an open end, a piston rod telescopingly received at one end within the open end of the cylinder and having a free end outside of the cylinder, and end fittings mounted on each of the closed end of the cylinder and the free end of the piston rod, the end fittings comprising a ball socket having an opening for receiving a ball stud;

enclosing the gas spring in its entirety with a removable protective sleeve, including the end fittings, said protective sleeve comprising a flexible, liquid spray-impermeable material capable of extending and contracting with telescopic movement of the piston rod relative to the cylinder;

installing the gas spring enclosed in the removable protective sleeve in the vehicle, including penetrating the removable protective sleeve with the ball studs within the ball socket openings to prevent exposure of the gas spring; and stripping all visible portions of the removable protective sleeve from the gas spring following the completion of the painting process, leaving the gas spring as a permanent component of the vehicle.

6. The method of claim 5 wherein the liquid spray-impermeable material is a polypropylene.

7. The method of claim 5 wherein the liquid spray-impermeable material is a polyamide.

8. The method of claim 5 wherein the protective sleeve is closed with at least one of a twist tie, clip, or heat seal.

9. The gas spring assembly of claim 1, wherein the removable protective sleeve comprises a wall portion extending from an open end of the sleeve and formed with an opening therein, the opening sized to engage a hook.

10. The method of claim 5, wherein the protective sleeve further comprises a wall portion extending from an open end of the sleeve and formed with an opening therein, and enclosing the gas spring in its entirety with the protective sleeve includes engaging a hook in the opening of the sleeve and inserting the gas spring into the sleeve.

* * * * *